United States Patent [19]

Nelson

[11] Patent Number: 5,768,823
[45] Date of Patent: Jun. 23, 1998

[54] CONTROLLED APPLICATION OF WEED CONTROL CHEMICALS FROM MOVING SPRAYER

[75] Inventor: Terrence J. Nelson, Saskatoon, Canada

[73] Assignee: Canadian Space Agency, Quebec, Canada

[21] Appl. No.: 632,318

[22] Filed: Apr. 15, 1996

Related U.S. Application Data

[63] Continuation-in-part of Ser. No. 191,578, Feb. 4, 1994, Pat. No. 5,507,115.

[51] Int. Cl.⁶ ..................................................... A01M 7/00
[52] U.S. Cl. ................................................. 47/1.7; 47/1.01
[58] Field of Search ....................................... 47/1.01, 1.7

[56] References Cited

U.S. PATENT DOCUMENTS

| | | | |
|---|---|---|---|
| 5,144,767 | 9/1992 | McCloy | 47/1.7 |
| 5,222,324 | 6/1993 | O'Neall et al. | 47/1.7 |
| 5,278,423 | 1/1994 | Wangler et al. | 47/1.7 |

*Primary Examiner*—Terry Lee Melius
*Assistant Examiner*—Joanne C. Downs
*Attorney, Agent, or Firm*—David J. French

[57] ABSTRACT

A selective spraying weed control system utilizes weed detectors that identify weeds in a field of view and releases herbicide from individual nozzles. The timing of the release of herbicide from each nozzle is controlled to correspond to the actual ground speed of each nozzle. Such actual ground speed is extrapolated from direct measurements of ground speed taken from two separate locations in the weed spraying apparatus, and from the location of each nozzle within the apparatus.

3 Claims, 6 Drawing Sheets

CONTROLLED APPLICATION OF WEED CONTROL CHEMICALS FROM MOVING SPRAYER

This is a Continuation-in-Part application of application Ser. No. 08/191,578 filed Feb. 2, 1994 and issued as U.S. Pat. No. 5,507,115.

FIELD OF THE INVENTION

This invention relates means for applying herbicides to control of weeds. More specifically, it relates to an apparatus for selectively directing weed-killing chemicals to weeds under open-field conditions.

BACKGROUND TO THE INVENTION

Environmental and economic concerns are forcing agricultural producers to modify traditional practices to remain viable. Soil conservation, moisture conservation, and herbicide costs are the primary concerns facing the North American agricultural producer.

In most dry land farming the crops are moisture limited so that a field must be rotated, using a fallow year. The traditional practice in fallow is to use tillage to control the weeds. However in dry land conditions the use of tillage promotes moisture loss and soil erosion. Leaving the field to stubble reduces the moisture loss and soil erosion. The stubble is useful in trapping snow during the winter, reduces the evaporation during the summer, and fixes the soil to reduce erosion.

Chemical fallow procedures use herbicides to control the weeds in stubble. Traditionally chemical weed control procedures for land in fallow require the applicator to spray the entire field. Broadcast spraying of herbicide for weed control is more expensive, in the short term, than tillage.

Techniques have been developed to detect weeds in fallow or stubble fields so that the weeds can be selectively sprayed without spraying the entire field. Current general usage does not, however, adequately control the release of the herbicide spray. This is particularly true where the spraying boom must be swept in an arc. The present invention allows the applicator to more selectively spray weeds in stubble or fallow, thus reducing the cost of chemically controlled fallow.

A prior art selective sprayer product sold under the trademark Detect-Spray by an Australian company is described in U.S. Pat. No. 5,144,767.

Two further patents that specifically contemplate synchronizing the release of herbicide with the speed of all the spray nozzles carried by the vehicle boom are U.S. Pat. Nos. 5,222,324 and 5,278,423.

The present invention has as its objective the provision of an improved means for directing herbicidal spray at selected weeds and particularly weeds in portions of fallow or stubble fields where the farm implement providing weed-control chemicals must sweep out a radius while the chemicals are being applied to such weeds.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

The invention in its broadest aspect provides a means by which identified weeds are selectively sprayed with herbicide through use of multiple spray nozzles. The timing of the release of herbicide spray from each individual nozzle is co-ordinated with the speed with which each nozzle is passing over the ground. The individual speed at which each nozzle is passing over the ground is determined by measuring the ground speed at two points from within the structures carrying the nozzles, and extrapolating the ground speed of each nozzle in accordance with its location within the structure.

The controller provides a delay means that allows for the passage of time between the identification of a weed by a weed sensor, and the release of herbicidal spray by each individual weed spray nozzle as it passes over the ground, ensuring that herbicide is primarily released in order to arrive at the location where weeds have been detected. The object is to have the field of spray of each nozzle correspond with the probable presence of weeds, irrespective of the ground speed of each nozzle.

In a preferred embodiment, Ground Speed sensors are installed at two separated locations along with the booms carrying the spray nozzles, preferably at the boom ends causing them to traverse the field at the most sensitive locations for detecting differences in ground speed. In particular, controlled release is co-ordinated with the ground during the turning of the booms while the farm implement changes its direction of travel in the field.

The foregoing summarizes the principal features of the invention and some of its optional aspects. The invention may be further understood by the description of the preferred embodiments, in conjunction with the drawings, which now follow.

DESCRIPTION OF THE PREFERRED EMBODIMENT

The invention in respect of the identification of objects will be exemplified by reference to a weed control system. For convenience, the invention and its variants will hereafter be referred to as the Spray Vision System. The described weed detection system is only one example of a weed detection methodology and other means for detecting weeds may be employed.

Figure 1:
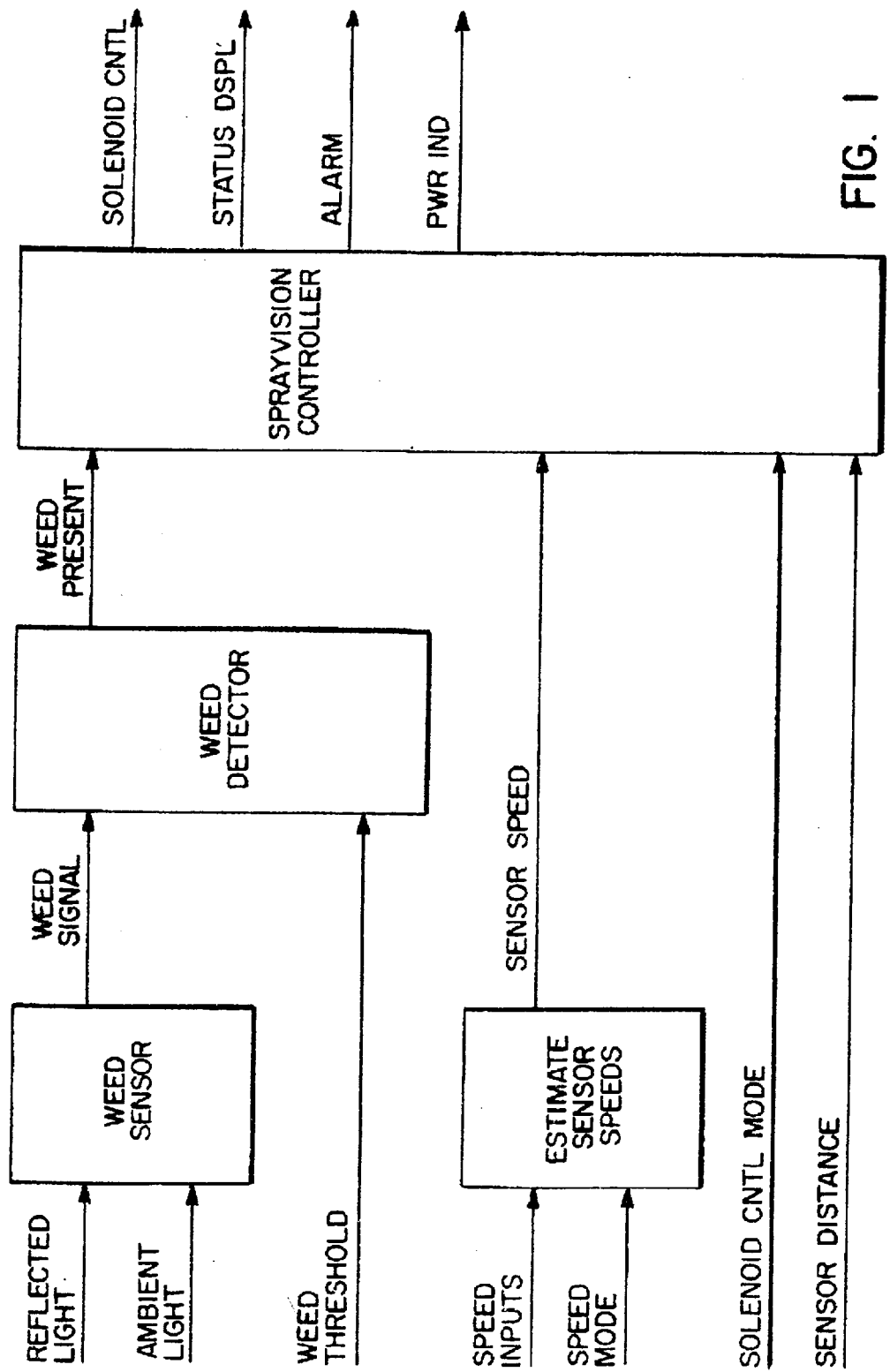
FIG. 1 is a functional block diagram of the weed detection and spray control functions of the invention.
Figure 2:
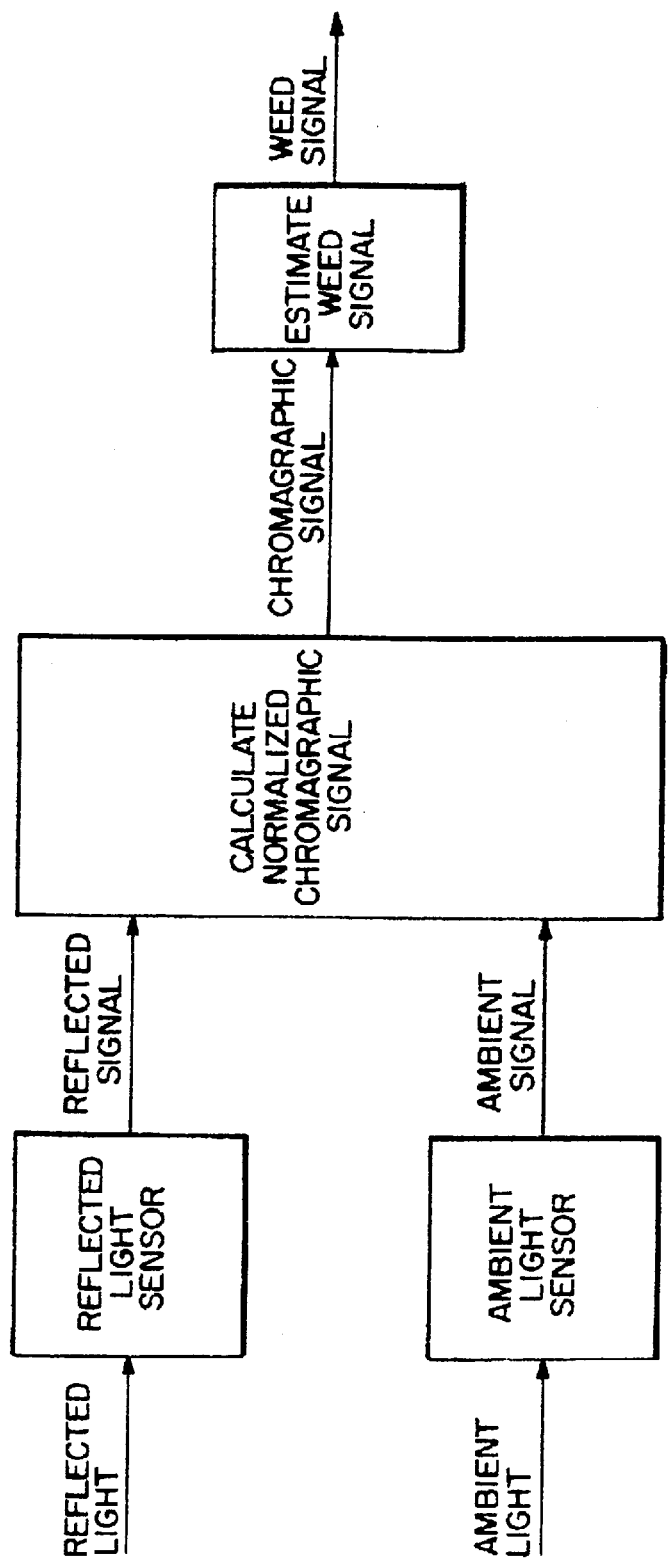
FIG. 2 is a functional block diagram of the weed sensor system.

The functional block diagram of the Spray Vision System shown in FIG. 1 provides a Weed Sensor which measures through chromatic filters the reflected chromagraphic light (Reflected Light) and, by comparison with the ambient chromagraphic light (Ambient Light) to produce a reflectance value, provides the Weed Signal. This is done by generating a chromatic vector based on four bands of the electromagnetic spectrum. Although four bands are preferred, at least three may be used. The Ambient Light is the amount of ambient light coming from the sky. The Reflected Light is the light reflected from the target area. The Weed Signal is, in the preferred mode, a four dimensional vector which is used to provide an estimation of the amount of weeds in the field-of-view.

The Weed Detector compares the Weed Signal in a colour space transform to the Weed Threshold, with an internally provided comparative standard, and determines if there is a basis to issue the Weed Present signal and effect the automatic spraying of the weeds. The Weed Threshold is an operator-adjustable level. The Weed Present signal is issued if the Weed Signal exceeds the Weed Threshold; otherwise the Weed Present signal is cleared.

The Estimate Sensor Speed function in FIG. 1 provides a signal based on the speed of at least two Sensors, or their equivalent, as they travel over the ground. These speed values can be provided from one of three different sources: by operator input, by a speed sensor mounted on the tractor, or by measuring the speed of the boom or nozzle support structure as it passes over the ground.

The Operator Input Speed parameter is preferably the default speed that can be entered by the operator from the cab of the tractor. The Tractor Speed parameter is determined by interfacing the System to the speedometer, or a groundspeed sensor, on the tractor. The Boom Speed parameter uses one or more groundspeed sensors located along the boom(s), preferably at or near the tips of the boom. Using this input data and knowing the location of each nozzle along the boom(s) the Spray Vision Controller then calculates the ground speed of each nozzle relative to it's position on the boom and controls release of herbicide.

The Speed Mode input is an operator input to allow the operator to select which method of estimating speed to use.

The Spray Vision Controller is a microprocessor which uses the various inputs to control the operation of each nozzle solenoid (via SolenoidCntl) that releases chemical herbicide. The Controller also sends status and alarm information to the operator.

The Solenoid Control Mode (SolenoidCntlMode) sets the operation of the Spray Vision Controller to one of three modes (OFF, ON, and AUTO). In the OFF mode the Solenoid Control (SolenoidCntl) output is forced to be off. In the ON mode the Solenoid Control is forced on. In the AUTO mode the Solenoid Control is determined by the Weed Present signal and the Sensor Distance (SensorDistance) which is the spacing between the Weed Sensor and the nozzle in the direction of travel.

The Sensor Distance, Sensor Speed, and the Solenoid Control turn-on delay inputs are used by the Spray Vision Controller to calculate the delay between when a Weed Present signal is generated or set, and when the Solenoid Control should be set to release herbicide from a nozzle. The objective of this calculation is to release the chemical herbicide from the nozzle at the moment when the nozzle passes over a weed. The delay function, and timing established by the Spray Vision Controller provides the valuable benefit of minimizing the consumption of herbicide by restricting its dispersal to substantially the area where weeds are located.

The Status Display (StatusDspl) output in FIG. 1 indicates if the Spray Vision Sensor is spraying or not. The Alarm indicates if the Spray Vision Sensor or system has a problem or fault. The Power Indication (PwrInd) indicates if there is power applied to the system.

The Weed Sensor may measure the presence of weeds by the preferred method described in U.S. application Ser. No. 08/191,578, now U.S. Pat. No. 5,507,115, the contents of which are adopted herein by reference.

Figure 3:
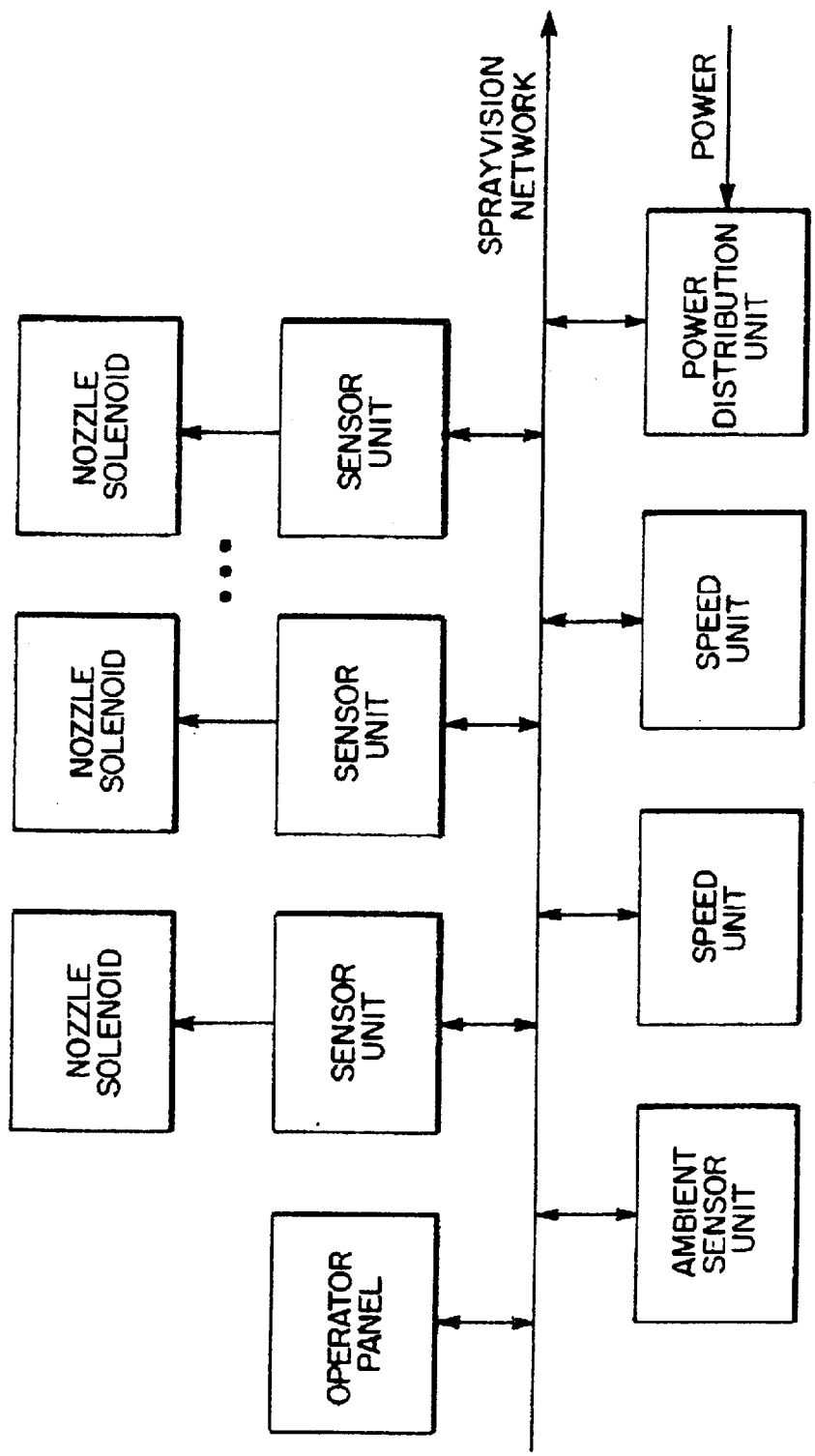
FIG. 3 is a schematic block diagram of the components of a multi-unit spray control system.

The invention preferably uses distributed microprocessor-based sensors to detect and selectively spray the weeds in a field. The system uses a distributed communications system to allow the individual units to exchange information for added flexibility and reliability. The system is designed in a modular fashion to allow for system flexibility and low cost, mass manufactured units. A simplified physical block diagram of the Spray Vision System is given in FIG. 3.

The Spray Vision Network allows the units to communicate with each other, to send operator commands to the Sensor Units, transmit ambient light levels to the sensors, transmit the ground speed, display status and alarms to the Operator Panel, and distribute power to the units.

As the Spray Vision System uses a distributed control structure, each Spray Vision Sensor contains a microprocessor that executes the decision algorithm and controls the solenoid locally. All of the relevant information required to execute the decision algorithm is transmitted to the sensor over the distributed communications system. The status and fault conditions of the sensor can be transmitted to other units using the communications satem also.

The alternative of a centralized controller, while possible, can reduce the reliability of the system because of the number of electrical connections, and because the centralized controller is typically more complex than the individual distributed controllers. The reliability of a centralized controller is typically lower than the reliability of a distributed control system because if the centralized controller fails then the entire system has failed; however if a distributed controller fails then only a small incremental portion of the system is inoperative and the rest of the system operates normally.

Figure 4:
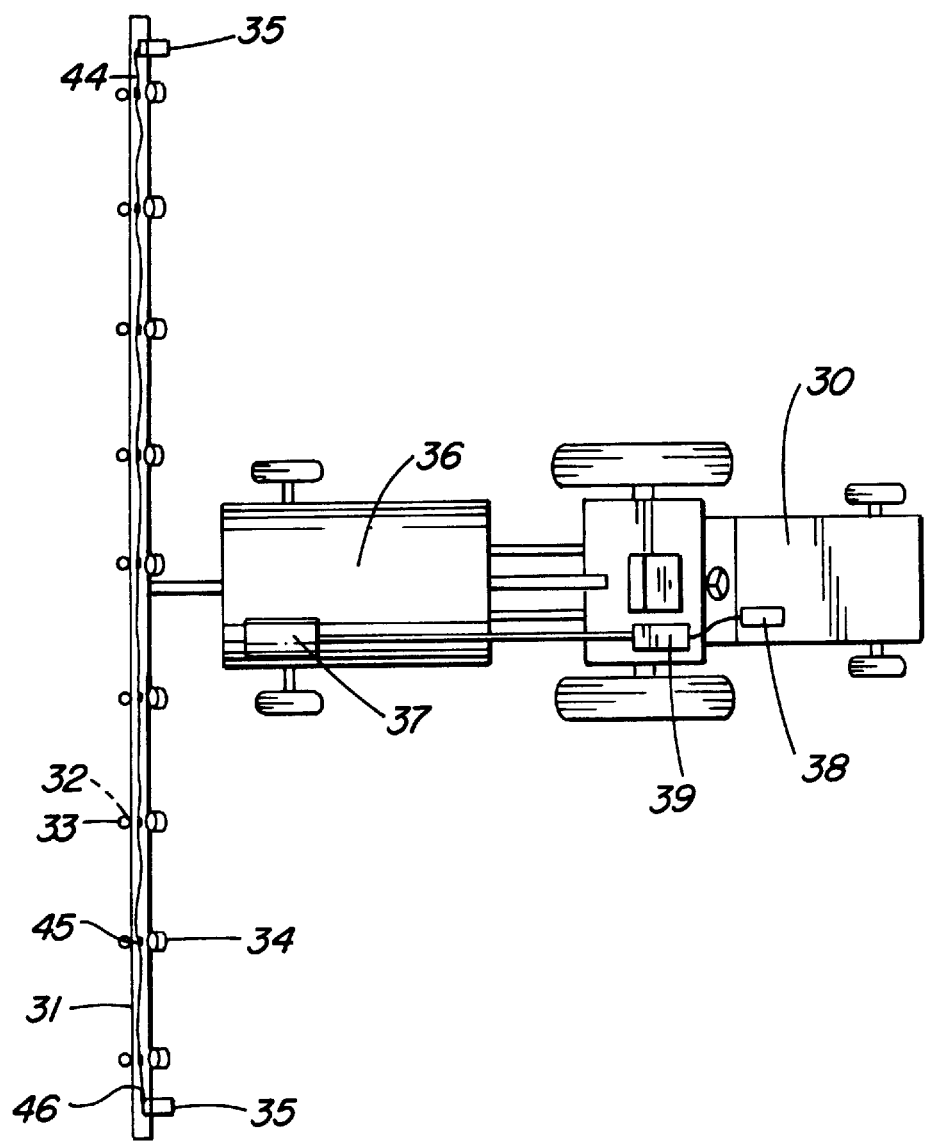
FIG. 4 is a plan view of a tractor pulling a boom with spray nozzles, viewing sensors and speed sensors.

The input speed of the unit to be used by each of the micro processors can be optionally entered at the Operation Panel, monitored at the tractor, or measured by the Speed Units located on the booms, the herbicide carrier or on the tractor. Preferably 2 Speed Sensors are utilized, one at either end of the boom, as shown in FIG. 4. The use of two ground speed measurements taken from separated locations within the nozzle support structure allows the Spray Vision Controller to compensate for tractor speed and turns. Use of two boom-mounted Speed Units is optional and the system employing the invention can operate on the basis of two ground speed inputs, one of which may be obtained using the tractor ground speed or an operator input speed which is attributed to a specific portion of the assembly, e.g. the tractor.

A variety of known ground speed measuring devices may be employed. These may operate on the basis of sonar, radar, laser light and may include wheel or speedometer-coupled wheel sensors. One sonar based system sold under the trade mark TRAK-STAR is referenced in U.S. Pat. No. 4,728,954.

In FIG. 4, a preferred arrangement is depicted in which a tractor 30 pulls a boom 31 carrying nozzles 32 with solenoids 33. Viewing sensors 34 and preferably two speed sensors 35 are located at the outermost ends of the boom 31. A sprayer tank 36 provides herbicide through tubing (not shown) to the nozzles 32. Power for the solenoids 33 originates from the power distribution assembly 37. An ambient light sensor 38 measures ambient light and an operator display 39 provides information to the operator.

Figure 5:
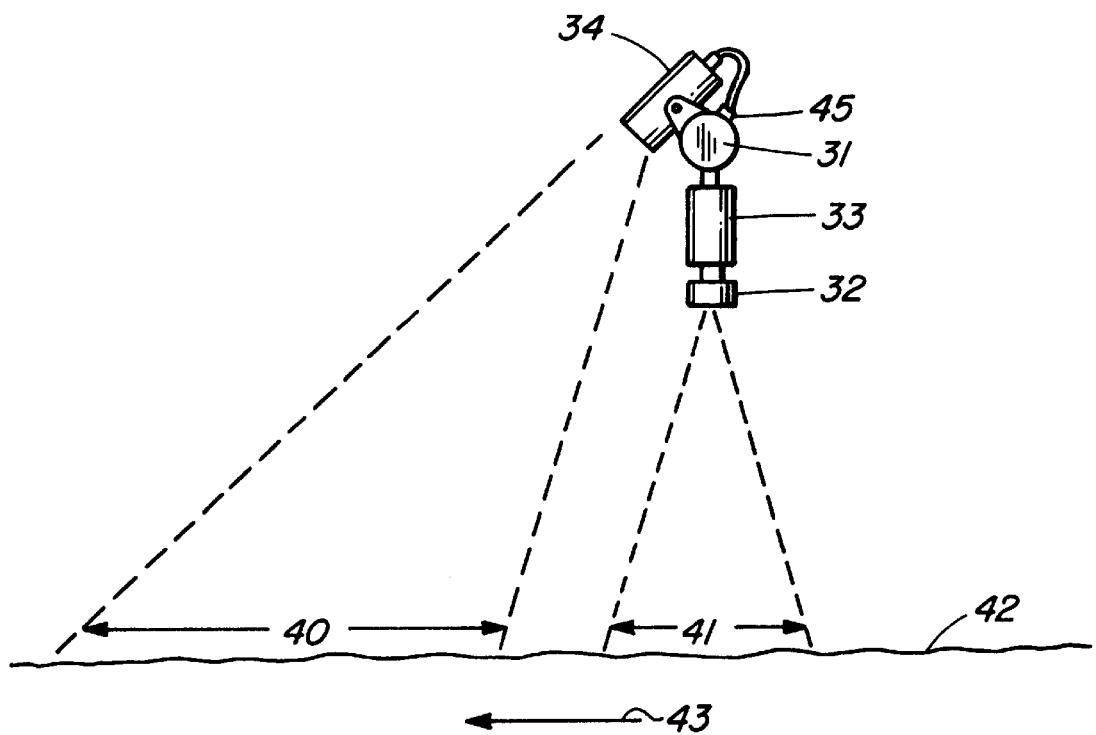
FIG. 5 is a profile schematic view of a viewing sensor and nozzle on the boom.

In FIG. 5, the viewing sensor 34 has a field-of-view 40, and the nozzle 32 has a field-of-spray 41. The microprocessor 45 for activation of the solenoid 33 times the opening of the nozzle 32 to allow for the speed over the ground 42 of the part of the boom 31 carrying each nozzle 32 in the direction of travel 43, as well as for the delay taken by the herbicide to pass from the nozzle 32 to the ground 42.

Figure 6:
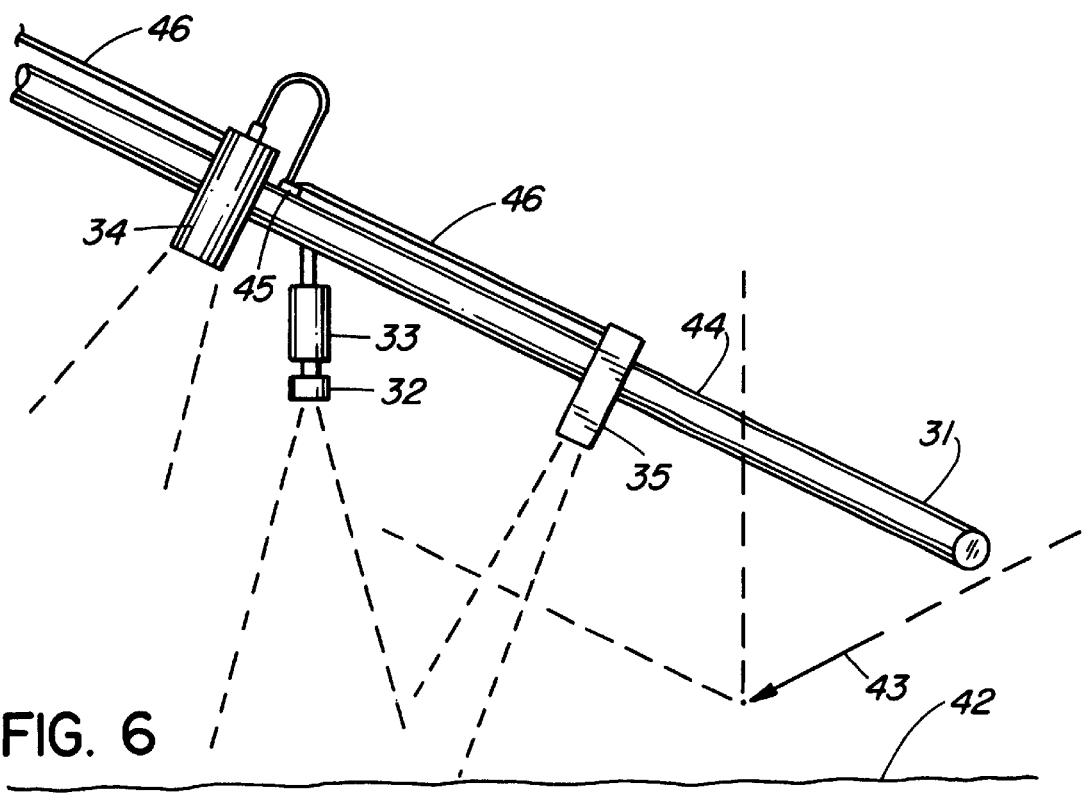
FIG. 6 is a perspective schematic depiction of the elements of FIG. 6 plus a ground speed sensor mounted on the boom.

In FIG. 6, a sonar or radar-type speed sensor 35 located along at a boom end views the ground and detects (from the motion of the image or by other means) the speed of the boom end 44 (where the sensor 35 is located) over the ground 42.

Figure 7:
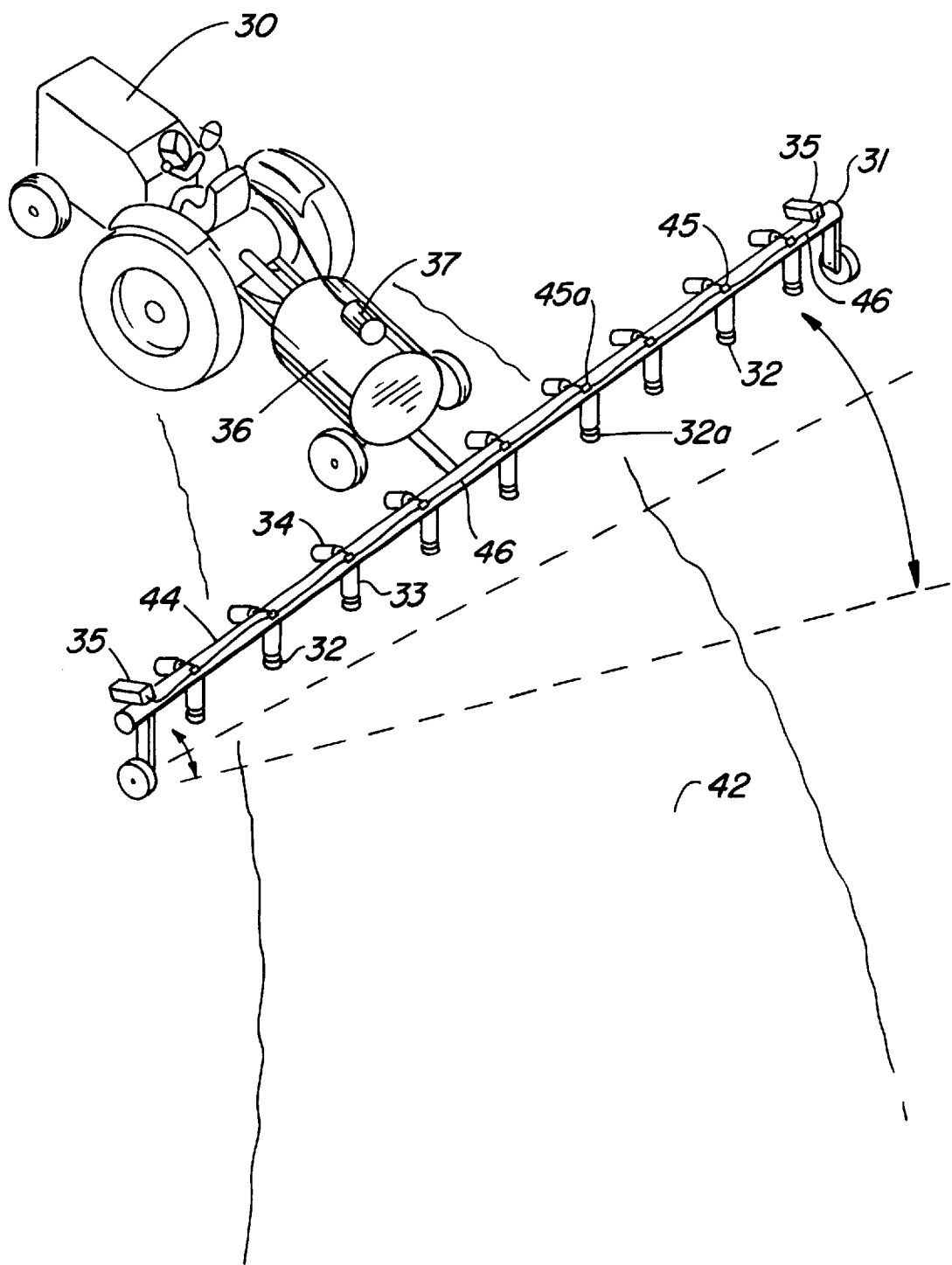
FIG. 7 is a depiction of the tractor of FIG. 4 as it sweeps its nozzle carrying booms in an arc.

As shown in FIG. 7, as the tractor wheels through a turn the individual processors/controllers 45 at each nozzle 32 receive the ground speed signal of at least two of the speed sensors 35 via wires 46. Based on their known locations along the boom 31, the individual controllers 45a can interpolate the ground speed for their assigned nozzle 32a. This permits individual adjustment of the timing of the release of herbicide by a nozzle to ensure that the field-of-view 40 and field-of-spray 41 overlap, even when the boom 31 is sweeping-out an arc.

Conclusion

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property is claimed are as follows:

1. A mobile chemical dispensing apparatus for applying herbicide to weeds through spray nozzles while the apparatus is travelling in a direction of travel over the ground comprising:

(1) a boom positioned transversely to the direction of travel of the apparatus over the ground;

(2) weed identification means carried by said boom for determining the probable presence of weeds within a field-of-view of said weed identification means;

(3) a plurality of spray nozzles carried by said boom, each of said spray nozzles having a respective field-of-spray for applying herbicide to weeds present within the field-of-view of said weed identification means;

(4) nozzle control means coupled between said weed identification means and each of said spray nozzles to cause the release of herbicide in proximity to said weeds; and (5) at least two ground speed sensors carried on said apparatus at at least two separated locations to provide signals reflecting ground speed detected by said at least two ground speed sensors, at said at least two separated locations, whereby said nozzle control means, with the advancement of said weed identification means and spray nozzles over the ground, effects release of said herbicide by said spray nozzles primarily when said field-of-spray coincides with the locations where the probable presence of weeds has been detected by said weed identification means, when said spray nozzles are moving over the ground at differing speeds.

2. An apparatus as in claim 1 wherein said at least two ground speed sensors are positioned on spaced locations on said boom.

3. An apparatus as in claim 1 wherein said at least two ground speed sensors are positioned respectively at the outer ends of said boom.

* * * * *